US012006721B2

(12) United States Patent
Budai et al.

(10) Patent No.: US 12,006,721 B2
(45) Date of Patent: Jun. 11, 2024

(54) FRAMELESS GLASS FENCING COMPONENT

(71) Applicant: BEYOND ARCHITECTURAL PTY LTD, Matraville (AU)

(72) Inventors: Adam Budai, Matraville (AU); Neil Robert Wilson, Sefton (AU); Gaby Budai, Matraville (AU)

(73) Assignee: BEYOND ARCHITECTURAL PTY LTD, Matraville (AU)

( * ) Notice: Subject to any disclaimer, the term of this patent is extended or adjusted under 35 U.S.C. 154(b) by 0 days.

(21) Appl. No.: 16/980,450

(22) PCT Filed: Mar. 15, 2019

(86) PCT No.: PCT/AU2019/050236
§ 371 (c)(1),
(2) Date: Sep. 14, 2020

(87) PCT Pub. No.: WO2019/173881
PCT Pub. Date: Sep. 19, 2019

(65) Prior Publication Data

US 2021/0017787 A1 Jan. 21, 2021

(30) Foreign Application Priority Data

Mar. 15, 2018 (AU) ................................ 2018900865
Apr. 30, 2018 (AU) ................................ 2018100559

(51) Int. Cl.
*E04H 17/16* (2006.01)
*E04F 11/18* (2006.01)
*E06B 3/54* (2006.01)

(52) U.S. Cl.
CPC ........ *E04H 17/168* (2013.01); *E04F 11/1812* (2013.01); *E04F 11/1817* (2013.01);
(Continued)

(58) Field of Classification Search
CPC ............... E04F 11/1812; E04F 11/1851; E04F 11/1853; E04F 2011/1897;
(Continued)

(56) References Cited

U.S. PATENT DOCUMENTS 8,500,110 B2 * 8/2013 Allen .................. E04F 11/1812
269/297
9,097,025 B2 * 8/2015 Procter ............... E04F 11/1812
(Continued)

FOREIGN PATENT DOCUMENTS

AU 2017101257 A4 10/2017
AU 2018100140 A4 3/2018
(Continued)

OTHER PUBLICATIONS

English Translation of DE4130823 Abstract.
(Continued)

*Primary Examiner* — Jonathan P Masinick
(74) *Attorney, Agent, or Firm* — Bauer and Joseph

(57) ABSTRACT

In one aspect there is disclosed a frameless glass fencing component (40) for a frameless glass fencing installation. The frameless glass fencing component (40) is produced from an engineering plastic and includes a substantially rigid reinforcing member (42).

10 Claims, 11 Drawing Sheets

(52) U.S. Cl.
CPC ........ *E04F 11/1853* (2013.01); *E06B 3/5481* (2013.01); *E04F 2011/1823* (2013.01)

(58) Field of Classification Search
CPC ....... E04F 2011/1823; E04F 2011/1831; E04F 2011/1895
See application file for complete search history.

(56) References Cited

U.S. PATENT DOCUMENTS

| | | | | |
|---|---|---|---|---|
| 9,322,161 | B2 * | 4/2016 | Schopf | E04F 11/1851 |
| 9,453,357 | B1 | 9/2016 | Bertato | |
| 9,995,043 | B2 * | 6/2018 | Bierman | E04F 11/1853 |
| 10,184,267 | B2 * | 1/2019 | Kuo | E04F 11/1812 |
| 11,719,015 | B2 * | 8/2023 | Haase | E04H 12/2238 256/65.14 |
| 2004/0009338 | A1 * | 1/2004 | Jo | B29C 70/506 428/297.4 |
| 2005/0193633 | A1 | 9/2005 | Scheer et al. | |
| 2005/0246981 | A1 * | 11/2005 | Austin | E04F 11/1851 52/208 |
| 2011/0164408 | A1 * | 7/2011 | Bol | B29C 70/521 427/256 |
| 2011/0239403 | A1 * | 10/2011 | Walhorn | E05D 11/00 24/457 |
| 2011/0260129 | A1 * | 10/2011 | Schopf | F16B 2/06 248/316.1 |
| 2012/0240493 | A1 * | 9/2012 | Petersen | E06B 3/66319 156/60 |
| 2012/0326108 | A1 * | 12/2012 | Eves | E04F 11/1836 256/60 |
| 2015/0043965 | A1 | 2/2015 | Mao-Cheia | |
| 2015/0330562 | A1 * | 11/2015 | Bonomi | F16M 13/022 248/558 |
| 2016/0208496 | A1 * | 7/2016 | Bierman | E04F 11/1853 |

FOREIGN PATENT DOCUMENTS

| | | | |
|---|---|---|---|
| DE | 4130823 | A1 | 3/1993 |
| EP | 2273036 | A2 | 1/2011 |
| EP | 2233391 | B1 | 5/2012 |
| WO | WO2006038804 | A2 | 4/2006 |
| WO | WO2009028962 | A1 | 3/2009 |
| WO | WO2011076719 | A2 | 6/2011 |

OTHER PUBLICATIONS

English Translation of DE4130823 Specification.
English Translation of DE4130823 Claims.
English Translation of WO2011076719.
International Search Report for PCT/AU2018/050067.
Australian Patent Publication No. 2018100140 Examination Report 1.
Australian Patent Publication No. 2018100140 Examination Report 2.
International Search Report for PCT/AU2019/050236.
Written Opinion for PCT/AU2019/050236.
Extended European Search Report which issued on EP19768078.8.

* cited by examiner

FRAMELESS GLASS FENCING COMPONENT

CROSS REFERENCE TO RELATED APPLICATIONS

The present application is a U.S. national stage application of PCT International Application No. PCT/AU2019/050236, filed Mar. 15, 2019, and published as PCT Publication WO/2019/173881 on Sep. 19, 2019, which claims priority to Australian Application No. AU 2018900865, filed on Mar. 15, 2018 and to Australian Application No. AU 2018100559, filed on Apr. 30, 2018. The disclosures of all the foregoing applications are hereby incorporated by reference in their entirety into the present application.

FIELD

The invention relates to a frameless glass fencing component, in particular but not exclusively, a frameless glass fencing component for use in installing a frameless glass fence for a swimming pool, balcony, decking or patio.

BACKGROUND

Swimming pool barriers are designed such that young children are unable to climb over them and most countries have strict laws governing what constitutes an acceptable pool barrier. In Australia, for example, all swimming pool barrier fencing must comply with the Australian Standard for Swimming Pool Fencing (AS1926). Some of the stipulations in that standard require that pool fencing be at least 1,200 mm high and that gates be built in such a way that they swing away from the pool and have a child safety lock.

It has become fashionable to provide swimming pool barriers and balcony balustrades in the form of frameless glass fences. Not only is glass durable to the moist environment of a swimming pool, it also provides an aesthetic appealing appearance which is in vogue in contemporary architectural design. A typical frameless glass fence for a pool includes a plurality of individual tempered glass panels which are supported by spaced apart mini-posts, referred to as spigots. Typically, two spigots are evenly spaced across the bottom edge of the glass panel and will clamp onto the panel and support it. Frameless glass fencing spigots must not only be strong to support a glass panel, they must preferably also be corrosion resistant and have favourable aesthetic features. For this reason conventional spigots are produced from anodized aluminium or polished stainless steel.

Frameless glass fencing for balconies, commonly referred to as glass balustrades, typically comprise tempered glass balustrade panels supported by, for example, posts, spigots, standoff fixings, glass clamps or floor glazing channels. Australian Standard AS1170 requires that frameless glass fences be designed to prevent a fall from a balcony. The standard further specifies that (i) the height of the glass fence must be at least 1000 mm when measured from the finished balcony floor level to the top of the balustrade, and (ii) must have a continuous interlinking handrail. Such handrail is required so as to inhibit a fall temporarily in the event of a glass panel of the glass balustrade breaking.

Drawbacks associated with current components employed in supporting glass panels in frameless glass fencing installations include that when they are not maintained or looked after for prolonged periods of time they tend to stain or corrode. In the case of pool fencing, spigots may be installed in a position where they are exposed to electric current and thus capable of conducting electric charge which could lead to a person being subjected to electric shock.

OBJECT

It is an object of the present invention to provide an alternative frameless glass fencing component for use in frameless glass fencing installations which addresses or at least ameliorates the above drawbacks or provides a useful alternative.

SUMMARY

According to a first aspect of the present invention there is disclosed herein a frameless glass fencing component for a frameless glass fencing installation, wherein the frameless glass fencing component is (i) produced from an engineering plastic and (ii) has an embedded substantially rigid reinforcing member over-moulded with the engineering plastic.

In a second aspect there is disclosed herein a frameless glass fencing installation including at least one glass panel and a frameless glass fencing component attached to the glass panel, the frameless glass fencing component (i) being produced from an engineering plastic, and (ii) being reinforced with an embedded substantially rigid reinforcing member over-moulded with the engineering plastic.

In a third aspect there is provided a method of installing a frameless glass fence, the method including the step of providing a frameless glass fencing component produced from an engineering plastic wherein a substantially rigid reinforcing member is over-moulded with the engineering plastic.

Preferably the reinforcing member is produced from steel, aluminium or an engineering plastic.

Preferably the steel is mild steel, stainless steel or an alloy steel.

Preferably the engineering plastic is covered with a coating.

Preferably the engineering plastic includes a base material.

Preferably the engineering plastic includes a base material and a reinforcing filler.

Preferably the reinforcing filler includes glass fibre.

Preferably the reinforcing filler includes carbon fibre.

Preferably the engineering plastic is a polyarylamide.

Preferably the polyarylamide includes glass fibre reinforcement wherein the concentration of the glass fibre reinforcement is between 50% to 60% by volume.

Preferably the engineering plastic is an epoxy vinyl ester resin.

Preferably the epoxy vinyl ester resin includes glass fibre reinforcement wherein the concentration of the glass fibre reinforcement is between 50% to 70% by volume.

Preferably the base material includes a polyamide.

Preferably the polyamide includes Nylon®.

Preferably the polyamide includes Zytel®.

Preferably the base material includes polyphenylene sulphide (PPS).

Preferably the base material includes styrene.

Preferably the frameless glass fencing component is a frameless glass fencing spigot.

Preferably the frameless glass fencing component is a frameless glass fencing latch.

Preferably the frameless glass fencing component is a frameless glass fencing standoff.

Preferably the frameless glass fencing component is a frameless glass fencing support clamp.

Preferably the frameless glass fencing component is a frameless glass fencing hinge.

Preferably the frameless glass fencing component is a frameless glass fencing rail connector.

Preferably the frameless glass fencing component is a frameless glass fencing clamp.

Preferably the frameless glass fencing component is a standoff face mounted fixing.

Preferably the frameless glass fencing component is a top rail for a glass balustrade.

Preferably the frameless glass fencing component is a frameless glass fencing floor glazing channel.

According to a further aspect there is disclosed herein a frameless glass fencing spigot for a frameless glass fencing installation, wherein the frameless glass fencing spigot is produced from an engineering plastic and includes (i) a post portion defining a slot operatively adapted to hold a portion of a glass panel of the frameless glass fencing installation, and (ii) a flange portion or a threaded portion operatively adapted to secure the post portion in an upright orientation, and wherein a rigid reinforcing member is embedded within the frameless glass fencing spigot and over-moulded with the engineering plastic.

Preferably the reinforcing member includes a holding portion and a base portion, the holding portion including two opposing wall members which define a reinforcing member slot therebetween, in use a portion of the glass panel being located within the reinforcing member slot.

BRIEF DESCRIPTION OF THE DRAWINGS

Preferred embodiments of the present invention will be described hereinafter, by way of examples only, with reference to the accompanying drawings, wherein.

DESCRIPTION OF PREFERRED EMBODIMENTS

Conventional frameless glass fencing components are produced from stainless steel or anodised aluminium. Drawbacks of employing such materials include relative high weight and costs. Further drawbacks associated with stainless steel products include that they tend to stain and corrode over a short or prolonged period of time. Preferred embodiments of the present invention address those problems by doing away with stainless steel/aluminium and providing frameless glass fencing components produced from an engineering plastic. Engineering plastics are plastic materials that are used in applications generally requiring higher performance in the areas of mechanical properties, heat resistance, chemical resistance, impact and fire retardancy. Also, as plastic generally does not conduct electricity, this feature will provide enhanced safety in a moist environment, such as a swimming pool. In particular the preferred engineering plastic will meet the requirements of AS3000:2007 for earth bonding where frameless glass fencing spigots are within arm's reach or up to 1.25 m from the water's edge of a swimming pool.

To provide an aesthetically pleasing appearance the engineering plastic may include an outer coating having a stainless steel appearance. Such coating may be available in a range of colours. Typically, coatings can be applied after surface activation of the engineering plastic product by either plasma, chemical-based materials or spray coatings. Final coatings can then be applied by electroplating, plasma surface coating, powder-coating, PVD coating or spray coating.

A typical embodiment engineering plastic includes a base material having a filler to provide added strength/reinforcing. In an embodiment frameless glass fencing component the filler includes glass fibre. In another embodiment frameless glass fencing component the filler includes carbon fibre.

In an embodiment frameless glass fencing component the base material includes a polyamide. Typical examples of polyamide which could be employed include those sold under the trade marks Nylon® and Zytel®.

In an alternative embodiment the base material of the engineering plastic includes polyphenylene sulfide (PPS). In yet a further alternative the base material of the engineering plastic includes styrene.

Figure 1:
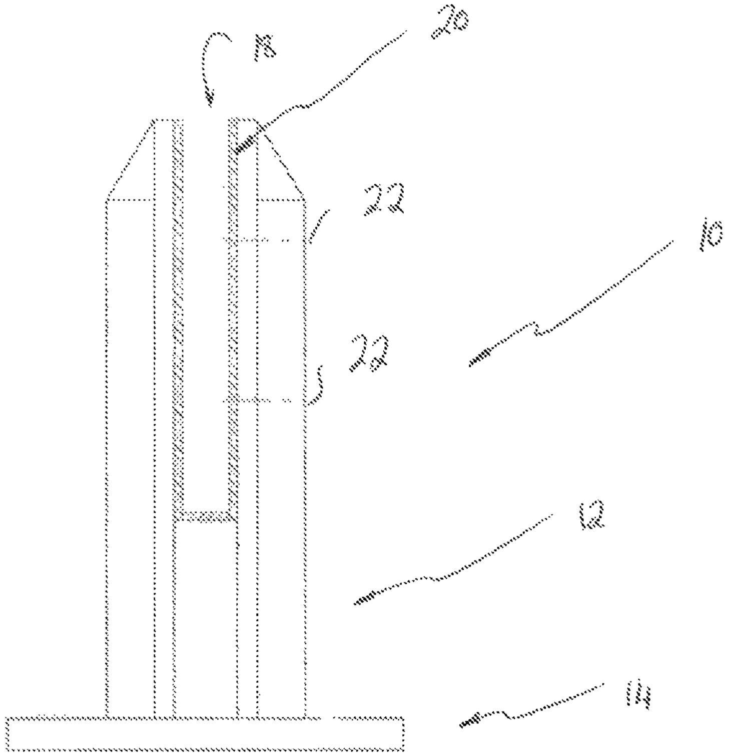
FIG. 1 is a schematic side view of a first embodiment frameless glass fencing component, here a frameless glass fencing spigot.
Figure 2:
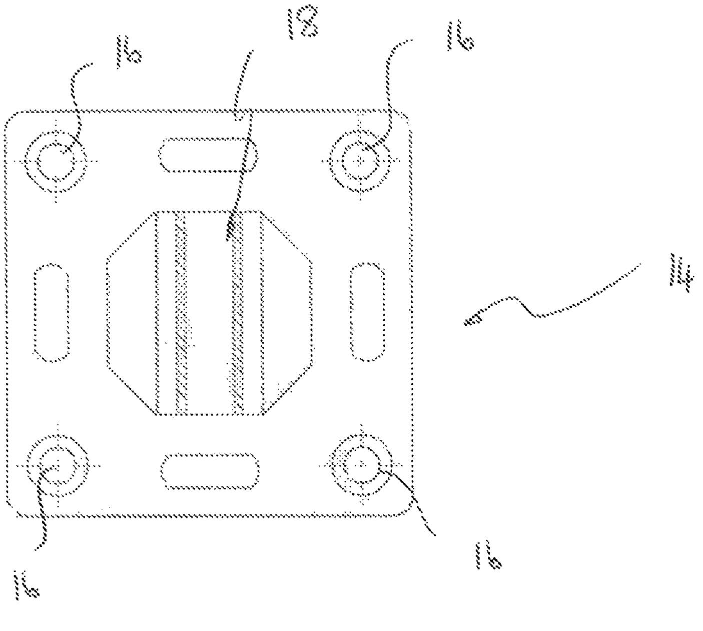
FIG. 2 is a schematic bottom view of the frameless glass fencing spigot of FIG. 1.

FIGS. 1 and 2 show a first embodiment frameless glass fencing component, here a frameless glass fencing spigot generally indicated with the reference numeral 10. The spigot 10 includes a post portion 12 and an attachment formation, here in the form of a flange portion 14. The post portion 12 and flange portion 14 are of unitary construction and produced from an engineering plastic. In this embodiment the engineering plastic is polyarylamide with a 50-60% by volume glass fibre reinforcement concentration. This engineering plastic is a light weight, non-corroding and non-conductive alternative to stainless steel and aluminium. In this embodiment the engineering plastic has an outer coating to provide the appearance of a stainless steel or coloured finish.

The flange portion 14 includes a plurality of fastener openings 16 for receiving non-illustrated fasteners, for example bolts, to secure the post portion 12 in an upright orientation adjacent a pool to be fenced in. The post portion 12 defines a slot 18 for receiving an end portion of a non-illustrated tempered glass panel when constructing a non-illustrated frameless glass fence. The slot 18 includes a polymer packer 20 to protect the glass panel. Typically, the glass panel is secured within the slot 18 with non-illustrated grub screws passing through transverse holes 22 in the post portion 12. In effect a frameless glass fence is constructed in a conventional manner, but with the stainless steel/aluminium spigots replaced with spigots produced from the engineering plastic.

Although not shown in FIGS. 1 and 2, the frameless glass fencing spigot 10 is reinforced with a metal reinforcing member embedded within the engineering plastic and which is over-moulded with the engineering plastic. Below described embodiments reference FIGS. 5 to 13 to provide further information on this aspect.

Figure 3:
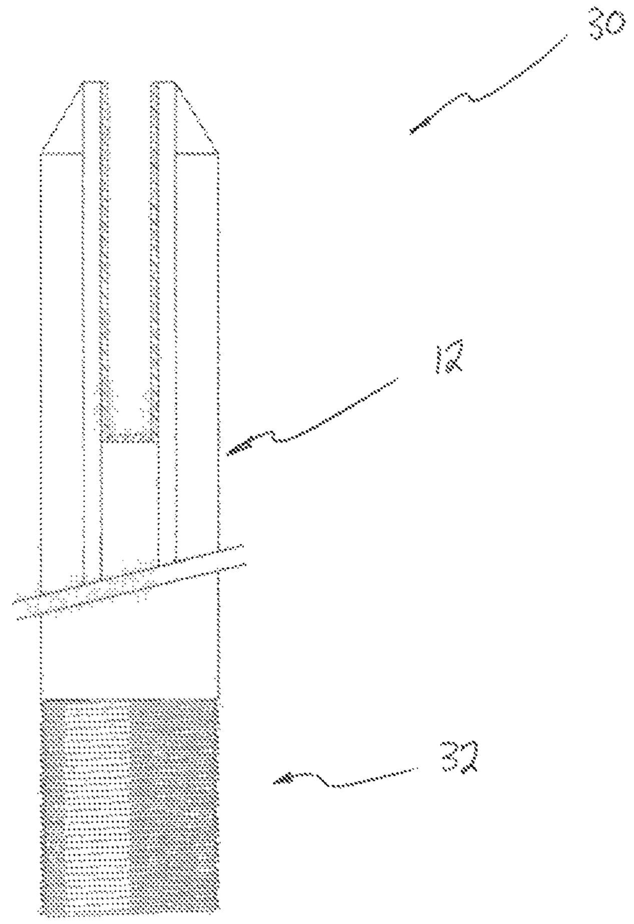
FIG. 3 is a schematic side view of a second embodiment frameless glass fencing component, here a frameless glass fencing spigot.
Figure 4:
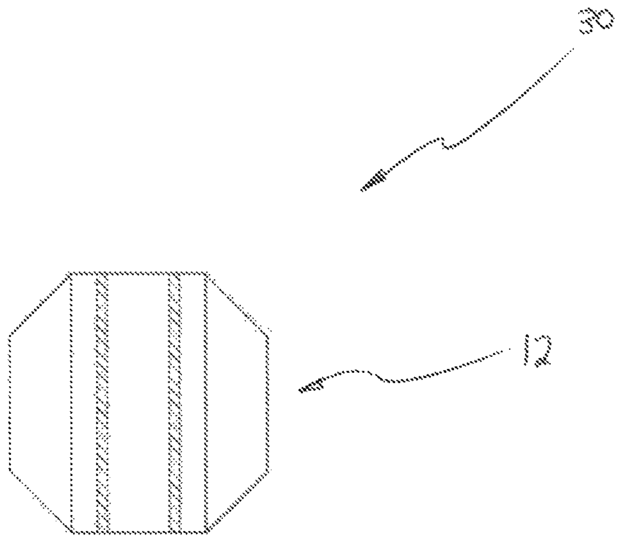
FIG. 4 is a schematic top view of the frameless glass fencing spigot of FIG. 3.

FIGS. 3 and 4 show a second embodiment frameless glass fencing component, here also a frameless glass fencing spigot, generally indicated with the reference numeral 30. The spigot 30 includes a post portion 12 similar to that of the spigot 10. The flange portion 14 of the spigot 10 is replaced with an alternative attachment formation, here a threaded portion 32 for location in a core drilled hole. As is the case with the spigot 10, the spigot 30 is also produced from an engineering plastic. However, in this embodiment the engineering plastic is provided in the form of an epoxy vinyl ester resin with a 50-70% by volume glass fibre reinforcement concentration. This material is resistant to water and other chemicals and has a high strength and other favourable mechanical properties.

Similar to the frameless glass fencing spigot 10, the frameless glass fencing spigot 30 is reinforced with a non-illustrated metal reinforcing member embedded within the engineering plastic. The embodiments of FIGS. 5 to 13 will provide further information on this aspect.

In a non-illustrated embodiment there is provided a frameless glass fencing latch wherein the latch is (i) produced from an engineering plastic and (ii) has a rigid reinforcing member embedded within the engineering plastic wherein the engineering plastic is an epoxy vinyl ester resin with a 50-70% by volume glass fibre reinforcement concentration. In this embodiment the reinforcing member is provided in the form of steel. It will of course be appreciated that the reinforcing member can be produced from a range of materials including aluminium or another engineering plastic.

In a non-illustrated embodiment there is provided a frameless glass fencing standoff wherein the standoff is (i) produced from an engineering plastic and (ii) has a rigid steel reinforcing member embedded within the engineering plastic wherein the engineering plastic is an epoxy vinyl ester resin with a 50-70% by volume glass fibre reinforcement concentration.

In a non-illustrated embodiment there is provided a frameless glass fencing support clamp wherein the clamp is (i) produced from an engineering plastic and (ii) has a rigid steel reinforcing member embedded within the engineering plastic wherein the engineering plastic is an epoxy vinyl ester resin with a 50-70% by volume glass fibre reinforcement concentration.

In a non-illustrated embodiment there is provided a frameless glass fencing hinge wherein the hinge is (i) produced from an engineering plastic and (ii) has a rigid reinforcing member embedded within the engineering plastic wherein the engineering plastic is an epoxy vinyl ester resin with a 50-70% by volume glass fibre reinforcement concentration.

In a non-illustrated embodiment there is provided a frameless glass fencing rail connector wherein the rail connector is (i) produced from an engineering plastic and (ii) has a rigid steel reinforcing member embedded within the engineering plastic wherein the engineering plastic is an epoxy vinyl ester resin with a 50-70% by volume glass fibre reinforcement concentration.

In a non-illustrated embodiment there is provided a frameless glass fencing clamp wherein the clamp is (i) produced from an engineering plastic and (ii) has a rigid steel reinforcing member embedded within the engineering plastic wherein the engineering plastic is an epoxy vinyl ester resin with a 50-70% by volume glass fibre reinforcement concentration.

In a non-illustrated embodiment there is provided a frameless glass fencing standoff face mounted fixing wherein the fixing is (i) produced from an engineering plastic and (ii) has a rigid steel reinforcing member embedded within the engineering plastic wherein the standoff face mounted fixing is a frameless glass fencing standoff face mounted fixing produced from an epoxy vinyl ester resin with a 50-70% by volume glass fibre reinforcement concentration.

It will be appreciated that the invention is not limited to glass barriers for pools, but could be employed in various frameless glass fencing installations such as glass balustrades on apartment balconies or glass balustrades in residential dwellings.

In a further non-illustrated embodiment there is provided glass balustrade top rail, wherein the glass balustrade top rail is (i) produced from an engineering plastic and (ii) has a rigid steel reinforcing member embedded within the engineering plastic wherein the engineering plastic is an epoxy vinyl ester resin with a 50-70% by volume glass fibre reinforcement.

In a non-illustrated embodiment there is provided a method of installing a frameless glass fence. The method includes the step of providing a frameless glass fencing component wherein the component is (i) produced from an engineering plastic and (ii) has a rigid reinforcing member embedded within the engineering plastic. Typically, the engineering plastic is (i) a polyarylamide with a 50-60% by volume glass fibre reinforcement concentration, or (ii) an epoxy vinyl ester resin with a 50-70% by volume glass fibre reinforcement concentration.

In a non-illustrated embodiment there is provided a frameless glass fencing post wherein the post is (i) produced from an engineering plastic and (ii) has a rigid steel reinforcing member embedded within the engineering plastic. Specifically, the post is a glass balustrade post produced from (i) a polyarylamide with a 50-60% by volume glass fibre reinforcement concentration, or (ii) an epoxy vinyl ester resin with a 50-70% by volume glass fibre reinforcement concentration.

In a non-illustrated embodiment there is provided a frameless glass fencing floor glazing channel wherein the floor glazing panel is (i) produced from an engineering plastic and (ii) has a rigid steel reinforcing member embedded within the engineering plastic. Specifically, the floor glazing channel is produced from (i) a polyarylamide with a 50-60% by volume glass fibre reinforcement concentration, or (ii) an epoxy vinyl ester resin with a 50-70% by volume glass fibre reinforcement concentration.

Figure 5:
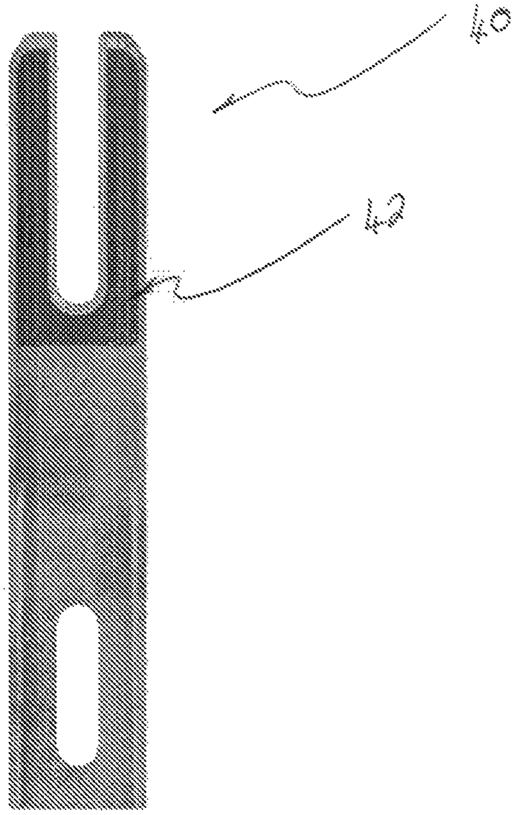
FIG. 5 is a schematic cross-sectional view of an embodiment frameless glass fencing spigot reinforced with a reinforcing member.

FIG. 5 shows an embodiment frameless glass fencing component 40, here a frameless glass fencing spigot for a non-illustrated frameless glass fencing installation. The frameless glass fencing spigot 40 is produced from an engineering plastic, here provided in the form of a polyarylamide with a 50-60% by volume glass fibre reinforcement concentration. The frameless glass fencing spigot 40 is reinforced with a steel reinforcing member 42. In this embodiment the reinforcing member 42 is provided in the form of an over-moulded insert. In use the reinforcing member 42 will act to provide additional strength and rigidity for the frameless glass fencing spigot 40.

Figure 6:
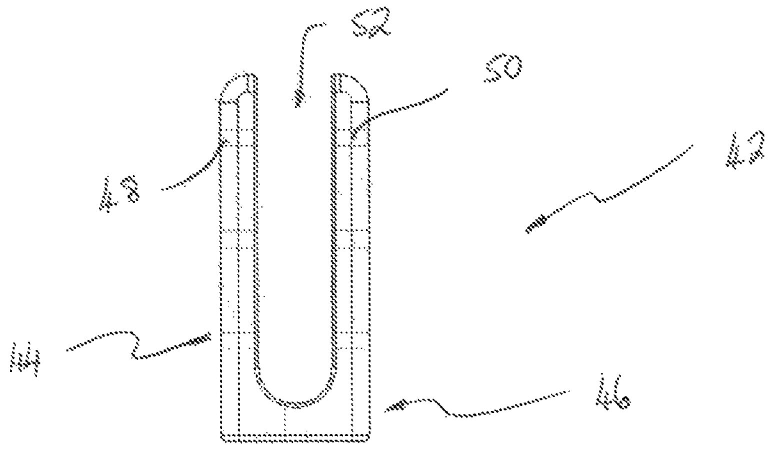
FIG. 6 is a schematic side view of the reinforcing member of the frameless glass fencing spigot of FIG. 5.
Figure 7:
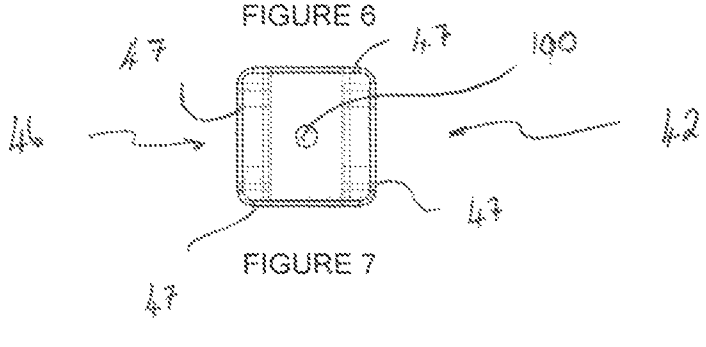
FIG. 7 is a schematic bottom view of the reinforcing member of FIG. 6.

Referring also to FIGS. 6 and 7, the reinforcing member 42 includes a holding portion 44 and a base portion 46. The holding portion 44 and base portion 46 are of unitary construction. In this embodiment the holding portion 44 includes two opposing wall members 48, 50 which define a reinforcing member slot 52 therebetween. In use a non-illustrated glass panel will be positioned in the reinforcing member slot 52 provided between the wall members 48, 50. The base portion includes 4 sides 47.

The reinforcing member 42 is over-moulded with engineering plastic and may require additional techniques to eliminate delamination of the reinforcing member from the over-mould material. Such techniques may include mechanical locking, surface primer solutions, plasma treating or other surface treatment technology to enhance adhesion between the reinforcing member and over-mould material.

Figure 8:
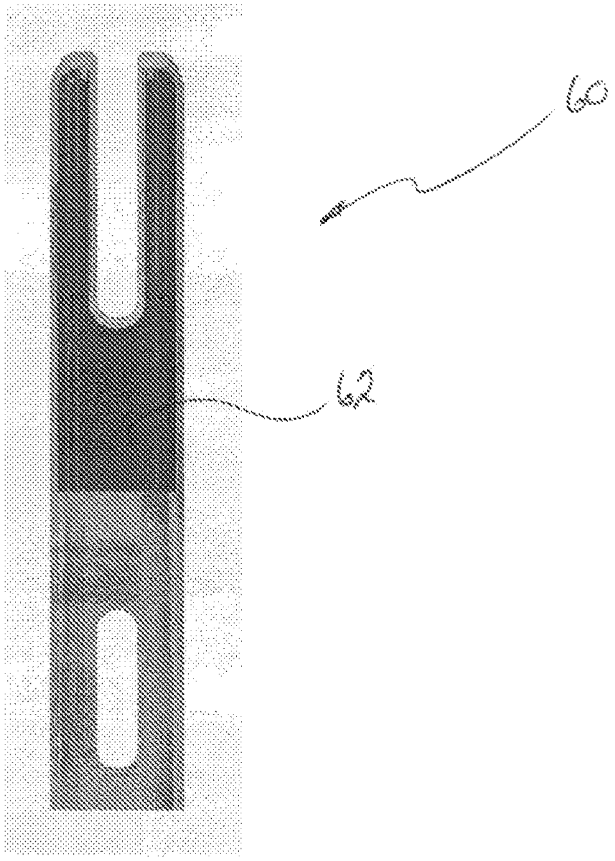
FIG. 8 is a schematic cross-sectional view of a further embodiment frameless glass fencing spigot reinforced with a reinforcing member.

FIG. 8 shows another embodiment frameless glass fencing spigot 60 for a non-illustrated frameless glass fencing installation. The frameless glass fencing spigot 60 is produced from an engineering plastic provided in the form of a polyarylamide with a 50-60% by volume glass fibre reinforcement concentration. The frameless glass fencing spigot 60 is reinforced with a steel reinforcing member 62. The reinforcing member 62 is provided in the form of an over-moulded insert and operatively acts to provide additional strength and rigidity for the frameless glass fencing spigot 60 when a glass panel is held.

Figure 9:
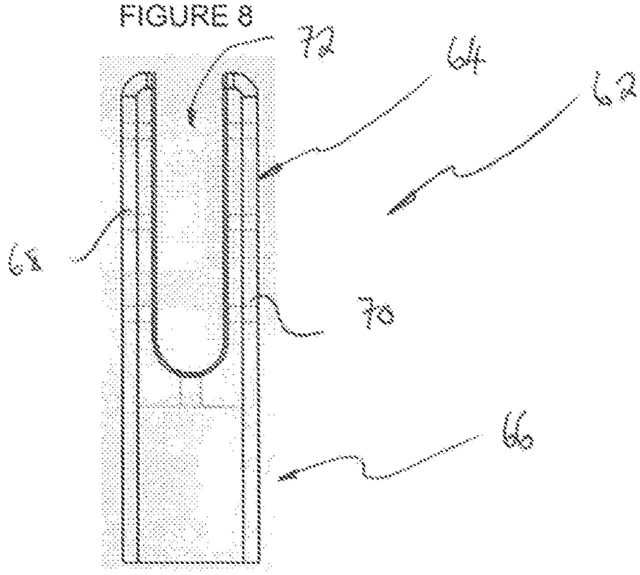
FIG. 9 is a schematic side view of the reinforcing member of the frameless glass fencing spigot of FIG. 8.
Figure 10:
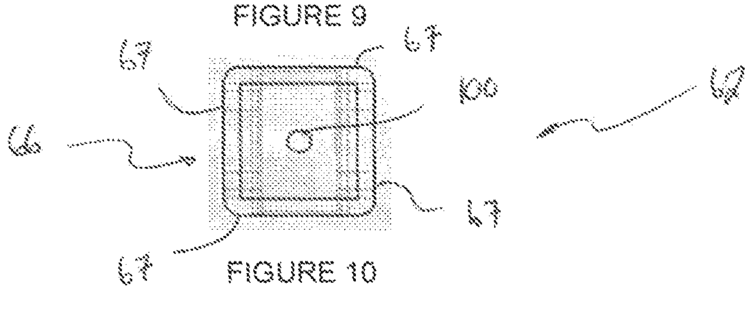
FIG. 10 is a schematic bottom view of the reinforcing member of FIG. 9.

Referring also to FIGS. 9 and 10, the reinforcing member 62 includes a holding portion 64 and a base portion 66. The holding portion 64 and the base portion 66 are of unitary construction. In this embodiment the holding portion 64 includes two opposing wall members 68, 70 which define a reinforcing member slot 72 therebetween. In use a non-illustrated glass panel is located within the reinforcing member slot 72 formed between the wall members 68, 70. The reinforcing member 62 differs from the reinforcing member 42 in that the base portion 66 of the reinforcing member 62 is of longer dimension than the base portion 46 of the reinforcing member 42. The base portion includes 4 sides 67.

Figure 11:
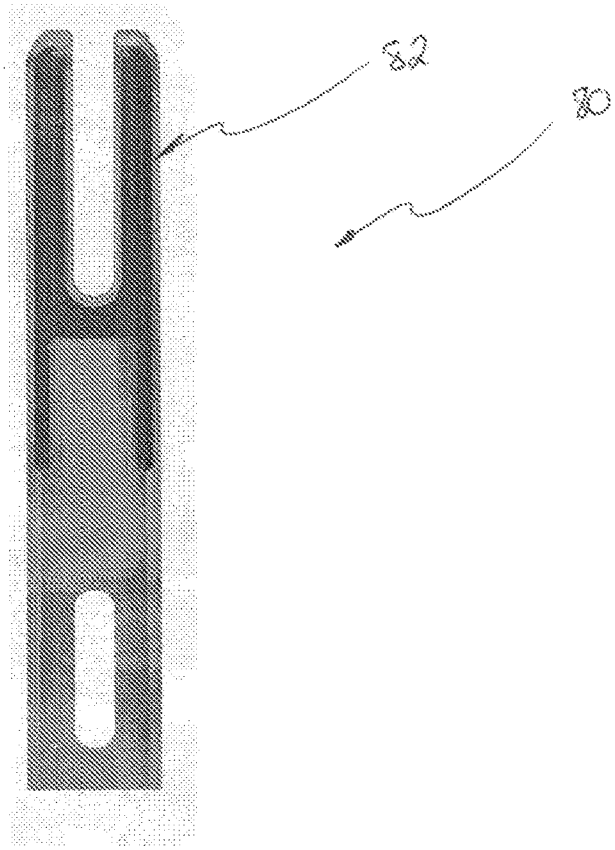
FIG. 11 is a schematic cross-sectional view of yet a further embodiment frameless glass fencing spigot reinforced with a reinforcing member.

FIG. 11 shows yet another embodiment frameless glass fencing spigot 80 for a non-illustrated frameless glass fencing installation. The frameless glass fencing spigot 80 is produced from an engineering plastic provided in the form a polyarylamide with a 50-60% by volume glass fibre reinforcement concentration. The frameless glass fencing spigot 80 is reinforced with a steel reinforcing member 82. The reinforcing member 82 is provided in the form of an over-moulded insert and operatively acts to provide additional strength and rigidity for the frameless glass fencing spigot 80.

Figure 12:
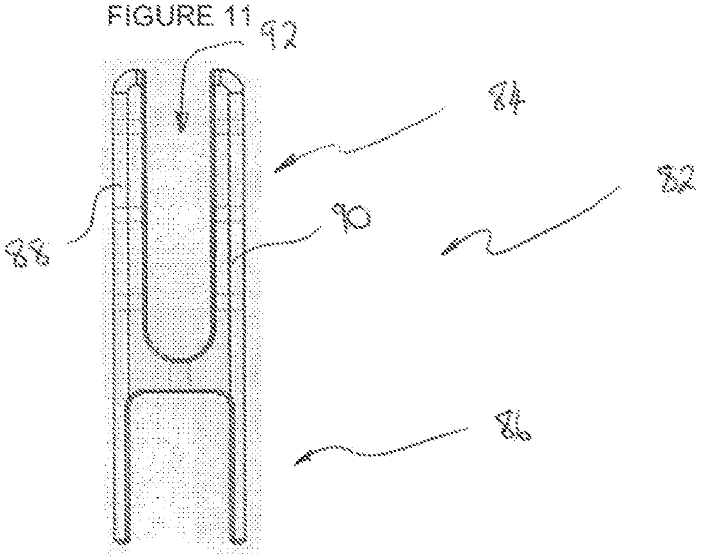
FIG. 12 is a schematic side view of the reinforcing member of the frameless glass fencing spigot of FIG. 11.
Figure 13:
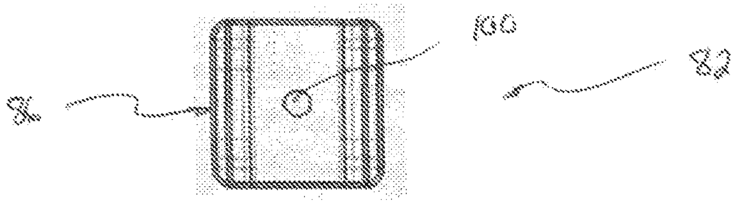
FIG. 13 is a schematic bottom view of the reinforcing member of FIG. 12.

Referring also to FIGS. 12 and 13, the reinforcing member 82 includes a holding portion 84 and a base portion 86. The holding portion 84 and the base portion 86 are of unitary construction. In this embodiment the holding portion 84 includes two opposing wall members 88, 90 which define a reinforcing member slot 92 therebetween. In use a non-illustrated glass panel will be located within the reinforcing member slot 92 formed between the wall members 88, 90. The reinforcing member 82 differs from the reinforcing member 62 in that the base portion 86 of the reinforcing member 82 includes two opposing legs 94 defining a base slot 96. In the base portions 46, 66 of the reinforcing members 42, 62 there is no such base slot, rather an oblong cavity is defined by four base wall members, indicated respectively with the reference numerals 47, 67 in FIGS. 7 and 10.

All three base members 40, 60, 80 has a hole 100, shown in FIGS. 7, 10 and 13 respectively, to allow the passage of plastic therethrough.

Figure 14:
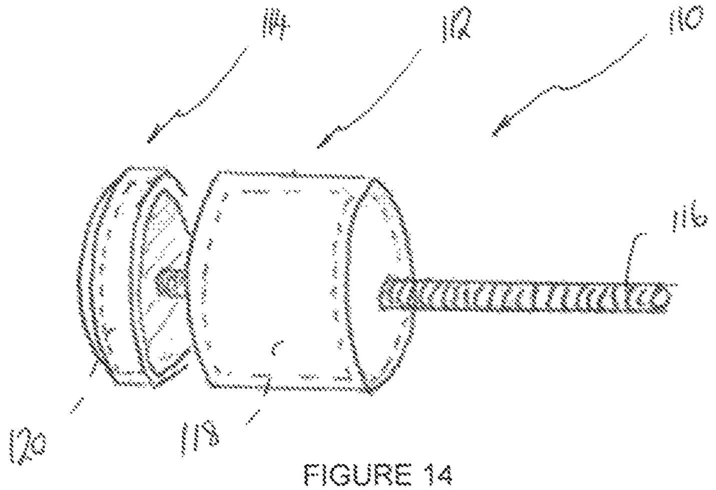
FIG. 14 is a schematic perspective view of an embodiment frameless glass fencing standoff.

FIG. 14 shows an embodiment frameless glass fencing standoff 110 for use in constructing a non-illustrated frameless glass fencing installation. Persons skilled in the art will appreciate that standoffs are used to secure glass panels to structural surfaces. The frameless glass fencing standoff 110 includes a standoff body 112 and a standoff head 114 produced from a polyarylamide having a 50-60% by volume glass fibre reinforcement concentration. The standoff body and standoff head 112, 114 are mounted to a threaded rod 116. The threaded rod 116 is operatively secured to a structural surface. Both the standoff body 112 and the standoff head 114 include a rigid reinforcing member, respectively indicated with the reference numerals 118 and 120 embedded within the polyarylamide. In this embodiment the threaded rod is produced from steel, but it will be appreciated that it could also be produced from an engineering plastic such as a polyarylamide having glass fibre reinforcement.

Figure 15:
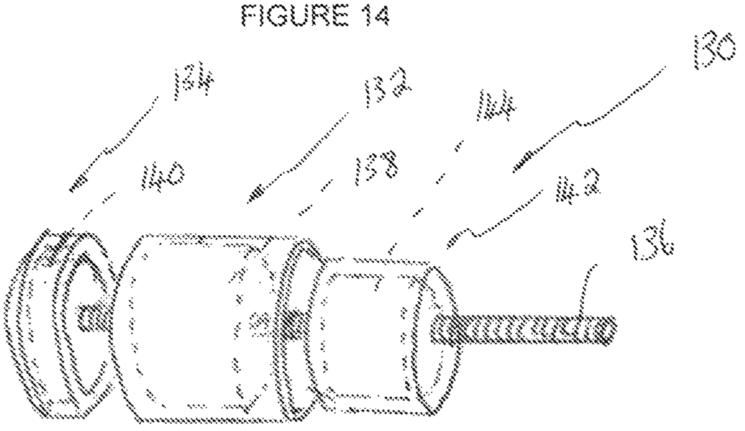
FIG. 15 is a schematic perspective view of another embodiment frameless glass fencing standoff.

FIG. 15 shows another embodiment frameless glass fencing standoff 130. The frameless glass fencing standoff 130 is similar to the frameless glass fencing standoff 110 in that it includes a first standoff body 132 and a standoff head 134 produced from a polyarylamide having a 50-60% by volume glass fibre reinforcement concentration. The standoff body and standoff head 132, 134 are mounted to a threaded rod 136 produced from an engineering plastic, such as a polyarylamide having glass fibre reinforcement. The standoff body 132 and standoff head 134 each includes a rigid steel reinforcing member, respectively indicated with the reference numerals 138, 140 embedded within the polyarylamide. The frameless glass fencing standoff 130 further includes a second spacing standoff body 142 also produced from a polyarylamide having a 50-60% by volume glass fibre reinforcement concentration. The second spacing standoff body 142 is operatively mounted to the threaded rod 136 and located between the first standoff body 132 and a non-illustrated structural surface. The spacing standoff body 142 includes a rigid steel reinforcing member 144 embedded within the polyarylamide.

It will be appreciated that the reinforcing member could be produced from a range of products, including an engineering plastic, steel including mild steel, stainless steel or alloy steel as well as aluminium.

Figure 16:
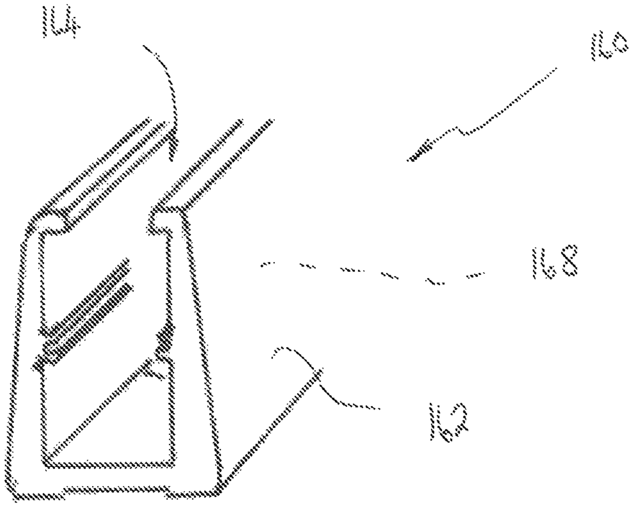
FIG. 16 is a schematic perspective view of an embodiment frameless glass fencing channel.

FIG. 16 shows an embodiment frameless glass fencing floor glazing channel 160 produced from an engineering plastic, here a polyarylamide having a 50-60% by volume glass fibre reinforcement concentration. The channel 160 includes an elongate, longitudinally extending channel body 162 which defines an elongate glazing slot 164 operatively adapted to receive a glass panel. A non-illustrated rigid reinforcing member 166 is over-moulded with the polyarylamide and embedded therein.

In a non-illustrated embodiment the frameless glass fencing floor glazing channel of FIG. 16 is produced from a polyamide having a glass fibre reinforcement.

In yet another non-illustrated embodiment there is provided a frameless glass fencing floor glazing channel, for example one having the same configuration as the channel of FIG. 16, produced from an epoxy vinyl ester resin having a 50-70% by volume glass fibre reinforcement concentration.

Figure 17:
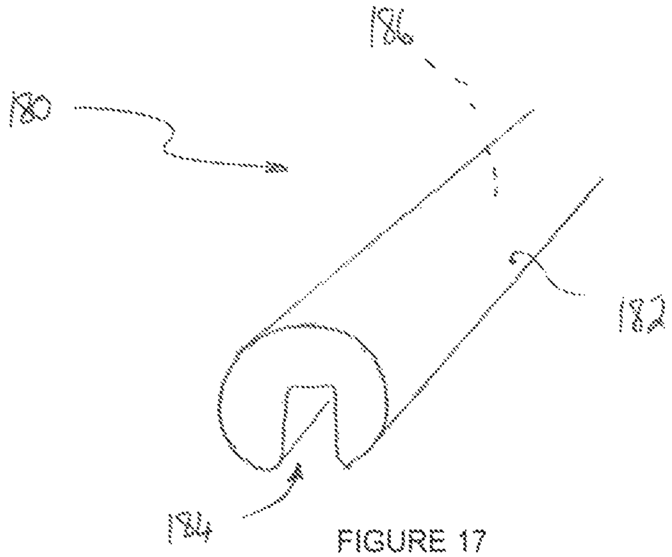
FIG. 17 is a schematic perspective view of a first embodiment frameless glass fencing top rail.

FIG. 17 shows an embodiment frameless glass fencing top rail 180, in this embodiment a glass balustrade top rail, produced from an engineering plastic in the form of a polyarylamide having a 50-60% by volume glass fibre reinforcement concentration. The top rail 180 includes an elongate, longitudinally extending rail body 182 which defines an elongate slot 184 operatively adapted to receive a top portion of a glass panel. An outer surface of the rail body 182 is curved as show. A non-illustrated rigid reinforcing member 186 is over-moulded with the polyarylamide and embedded therein.

Figure 18:
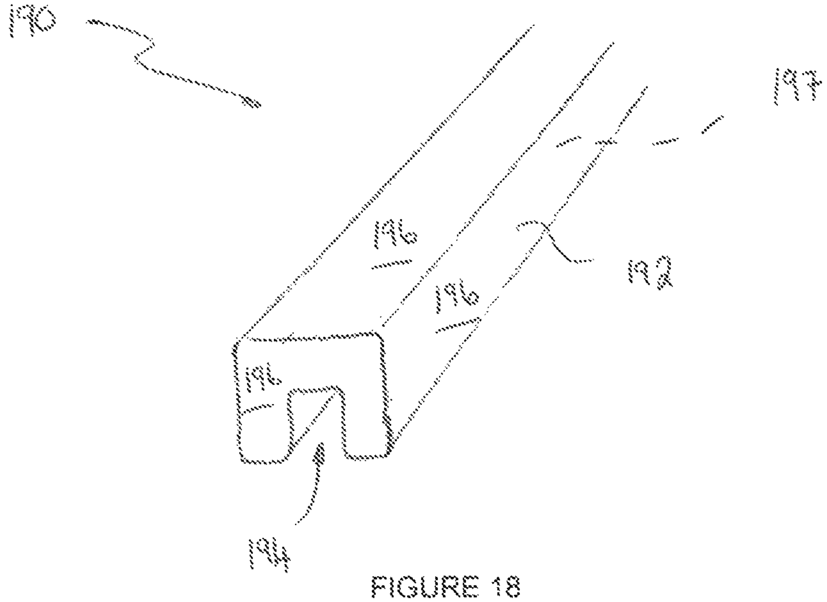
FIG. 18 is a schematic perspective view of a second embodiment frameless glass fencing top rail.

FIG. 18 shows an embodiment frameless glass fencing top rail 190, specifically a glass balustrade top rail, produced from an engineering plastic in the form of a polyarylamide having a 50-60% by volume glass fibre reinforcement concentration. The top rail 190 includes an elongate, longitudinally extending rail body 192 which defines an elongate slot 194 operatively adapted to receive a top portion of a glass panel. The rail body 192 includes a number of substantially flat outer surfaces 196. A non-illustrated rigid reinforcing member 197 is over-moulded with the polyarylamide and embedded therein.

In non-illustrated embodiments the frameless glass fencing top rail of FIGS. 17 and 18 are produced from a polyamide having a glass fibre reinforcement.

In another non-illustrated embodiment there is provided a glass balustrade top rail, for example one similar in configuration as the top rails of FIGS. 17 and 18, produced from an epoxy vinyl ester resin having a 50-70% by volume glass fibre reinforcement.

Figure 19:
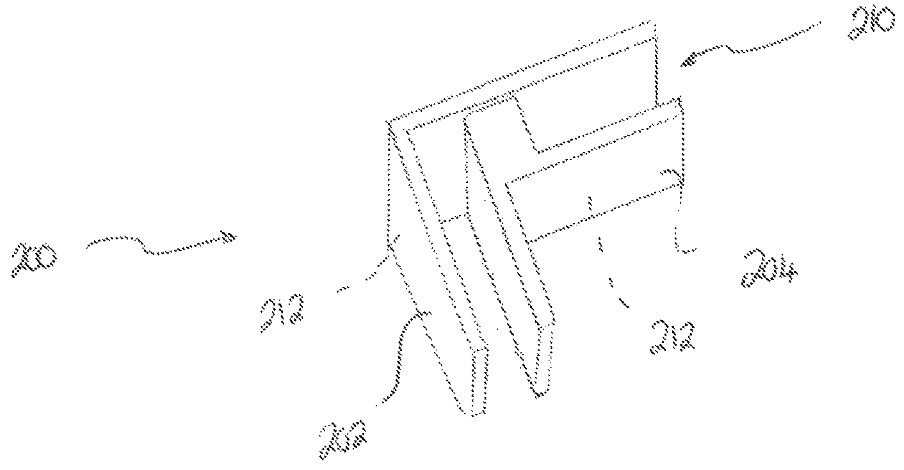
FIG. 19 is a schematic perspective view of a first embodiment frameless glass fencing clamp.
Figure 20:
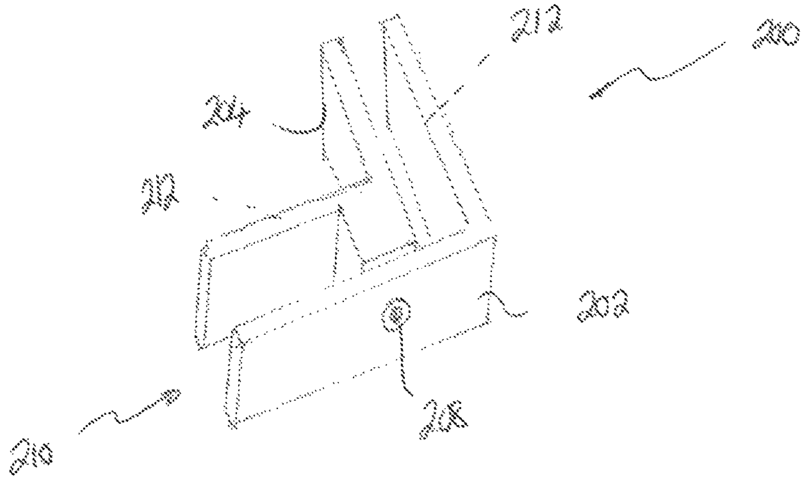
FIG. 20 is a second schematic perspective view of the frameless glass fencing clamp of FIG. 19.

FIGS. 19 and 20 show an embodiment frameless glass fencing clamp 200. In this embodiment the clamp 200 is a 90° frameless glass pool fencing clamp. The clamp 200 includes a first clamp member 202 operatively associated with a second clamp member 204, the first and second clamp members 202, 204 being produced from a polyarylamide having a 50-60% by volume glass fibre reinforcement concentration. The second clamp member 204 includes a spacer 206 which outwardly extends from a surface of the second clamp member 204. The first clamp member 202 is secured to the second clamp member 204 via a fastener 208 which extends from the first clamp member 202 into the spacer 206 of the second clamp member 204. By tightening the fastener 208 a non-illustrated glass panel located within a clamping area 210 can be securely clamped in position between the first and second clamp members 202, 204. Each of the first and second clamp members 202, 204 includes a non-illustrated rigid reinforcing member 212 over-moulded with the polyarylamide and embedded therein.

Figure 21:
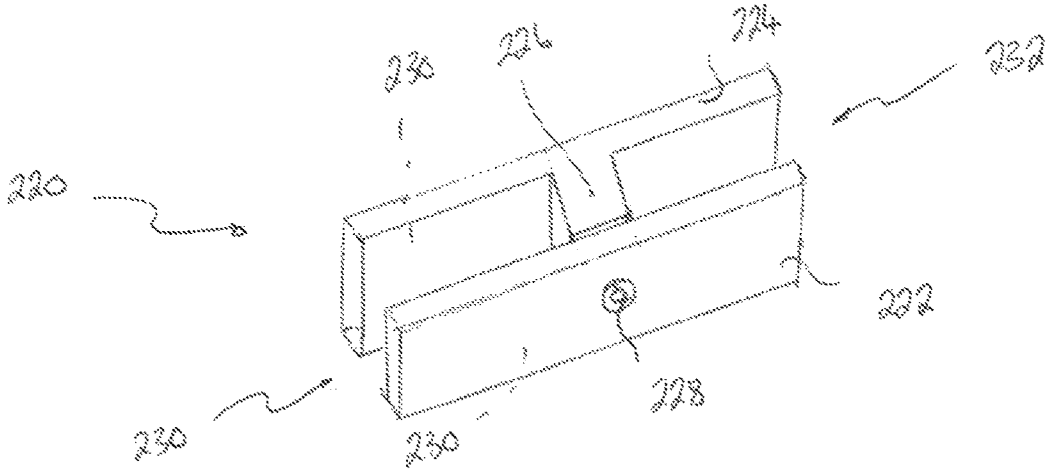
FIG. 21 is a schematic perspective view of a second embodiment frameless glass fencing clamp.

FIG. 21 shows another embodiment frameless glass fencing clamp 220. In this embodiment the clamp 220 is a 180° frameless glass pool fencing clamp. The clamp 220 includes a first clamp member 222 operatively associated with a second clamp member 224, the first and second clamp members 222, 224 being produced from a polyarylamide having a 50-60% by volume glass fibre reinforcement concentration. The second clamp member 224 includes a spacer 226 which outwardly extends from a surface of the second clamp member 224. The first clamp member 222 is secured to the second clamp member 224 via a fastener 228 which extends from the first clamp member 222 into the spacer 226 of the second clamp member 224. By tightening the fastener 228 two non-illustrated glass panels located within clamping areas 230, 232 will be securely clamped in position between the first and second clamp members 222, 224. Each of the first and second clamp members 222, 224 includes a non-illustrated rigid reinforcing member 230 over-moulded with the polyarylamide and embedded therein.

Figure 22:
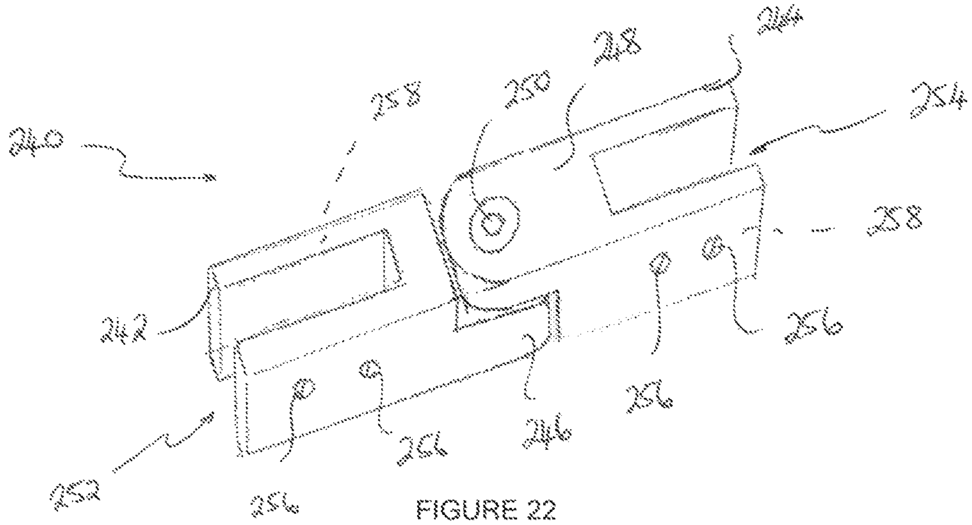
FIG. 22 is a schematic perspective view of a third embodiment frameless glass fencing clamp.

FIG. 22 shows another embodiment frameless glass fencing clamp 240. In this embodiment the clamp 240 is an adjustable frameless glass pool fencing clamp. The clamp 240 includes a first clamp member 242 operatively associated with a second clamp member 244, the first and second clamp members 242, 244 being produced from a polyarylamide having a 50-60% by volume glass fibre reinforcement concentration. The first clamp member 242 includes a flange 246 which is operatively adapted to be located proximate a flange 248 of the second clamp member 244. The flanges 246, 248 are connected via a fastener 250. In use the first and second clamp member 242, 244 can be pivoted about the fastener 250 until located in a desired orientation. The fastener 250 can then be fastened to secure the first and second clamp members 242, 244 in the desired orientation. The first and second fastener members 242, 244 respectively define holding slots 252, 254 for receiving respective edges of non-illustrated glass panels. The non-illustrated glass panels are secured within the holding slots 252, 254 with panel fasteners 256, here provided in the form of grub screws. Each of the first and second clamp members 242, 244 includes a non-illustrated rigid reinforcing member 258 over-moulded with the polyarylamide and embedded therein.

Figure 23:
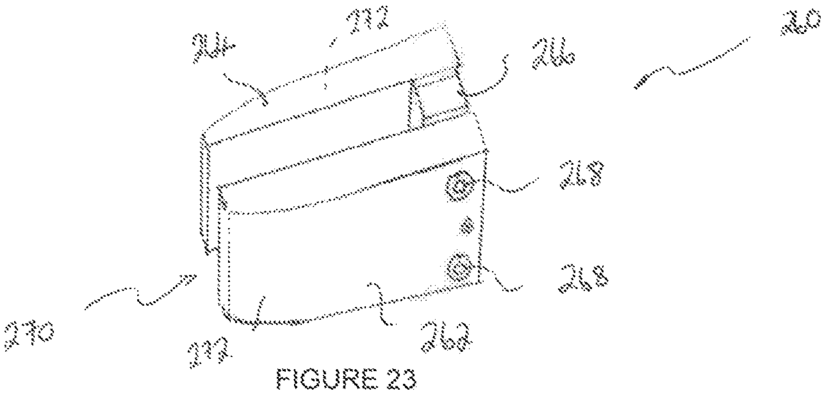
FIG. 23 is a schematic perspective view of a fourth embodiment frameless glass fencing clamp.

FIG. 23 shows a further embodiment frameless glass fencing clamp 260. The clamp 260 includes a first clamp member 262 operatively associated with a second clamp member 264, the first and second clamp members 262, 264 being produced from a polyarylamide having a 50-60% by volume glass fibre reinforcement concentration. A spacer 266 is held in position between the first and second clamp members 262, 264. The first clamp member 262 is secured to the second clamp member 264 via fasteners 268 which respectively extend from the first and second clamp members 262, 264 into the spacer 266. By tightening the fasteners 268 a non-illustrated glass panel, located within a clamping area 270 formed between the first and second clamp members 262, 264, will be securely clamped in position. Each of the first and second clamp members 262, 264 includes a non-illustrated rigid reinforcing member 272 over-moulded with the polyarylamide and embedded therein.

Figure 24:
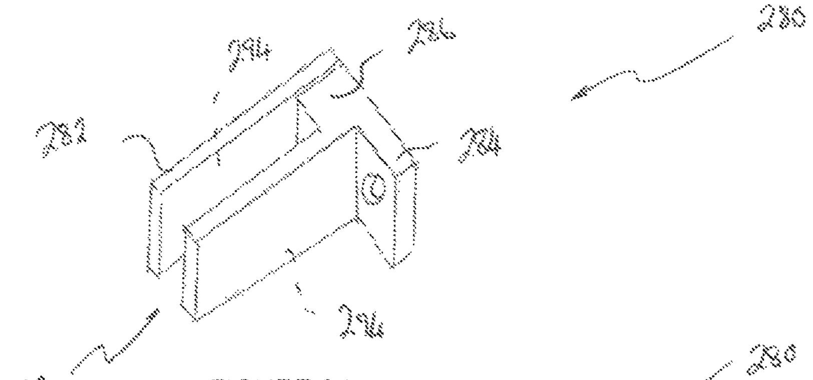
FIG. 24 is a schematic perspective view of a fifth embodiment frameless glass fencing clamp.
Figure 25:
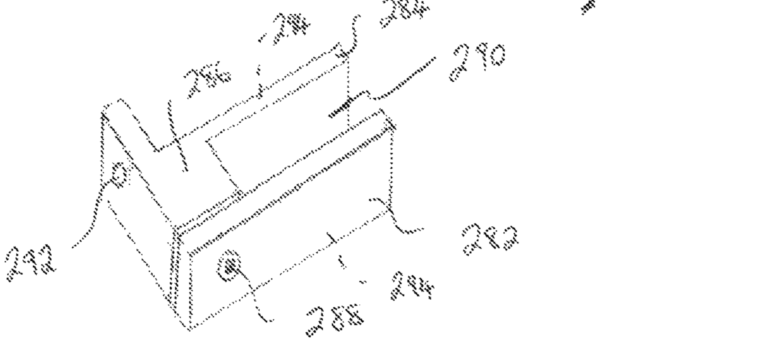
FIG. 25 is a second schematic perspective view of the frameless glass fencing clamp of FIG. 24.

FIGS. 24 and 25 show an embodiment frameless glass fencing clamp 280. In this embodiment the clamp 200 is a 90° frameless glass fencing wall clamp. The clamp 280 includes a first clamp member 282 operatively associated with a second clamp member 284, the first and second clamp members 282, 284 being produced from a polyarylamide having a 50-60% by volume glass fibre reinforcement concentration. The second clamp member 284 includes a spacer 286 which outwardly extends from a surface of the second clamp member 284. The first clamp member 282 is secured to the second clamp member 284 via a fastener 288 which extends from the first clamp member 282 into the spacer 286 of the second clamp member 284. By tightening the fastener 288 a non-illustrated glass panel located within a clamping area 290 can be securely clamped in position between the first and second clamp members 282, 284. The second clamp member 284 has a hole 292 through which a fastener is operatively passed to secure the clamp to a non-illustrated wall or other surface. Each of the first and second clamp members 282, 284 includes a non-illustrated rigid reinforcing member 294 over-moulded with the polyarylamide and embedded therein.

In further non-illustrated embodiments, the first and second clamp members of the frameless glass fencing clamps of FIGS. 18-25 are produced from an epoxy vinyl ester resin having a 50-70% by volume glass fibre reinforcement.

Figure 26:
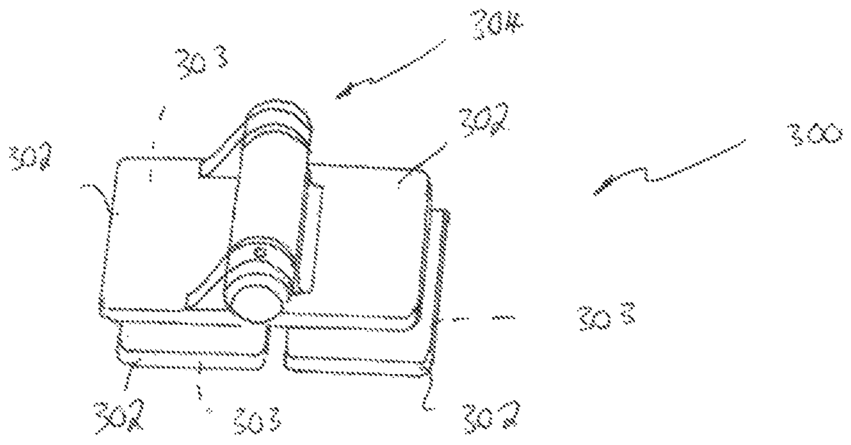
FIG. 26 is a schematic perspective view of a first embodiment frameless glass fencing hinge.

FIG. 26 shows an embodiment frameless glass fencing hinge 300, here a glass-to-glass 180° hinge. The hinge 300 includes a number of planar hinge members 302 configured so as to be attached to non-illustrated glass panels. In this embodiment the hinge members 302 are produced from a polyarylamide having a 50-60% by volume glass fibre reinforcement concentration. It will of course be appreciated that other parts of the hinge 200 could also be produced from a polyarylamide having a 50-60% by volume glass fibre reinforcement concentration. Each of the hinge members 302 includes a non-illustrated rigid reinforcing member 303 over-moulded with the polyarylamide and embedded therein.

The hinge 300 includes a hinge closure mechanism 304 to facilitate relative pivotal movement between the non-illustrated glass panels to which the hinge members 302 are attached. The hinge 300 operates in a conventional manner which will be familiar to persons skilled in the art. It is pointed out that the hinge closure mechanism 304 may be in the form of a spring mechanism, an hydraulic mechanism, a hydraulic with clutch mechanism, a combination with spring and hydraulic mechanism or other hinge closure mechanisms.

Figure 27:
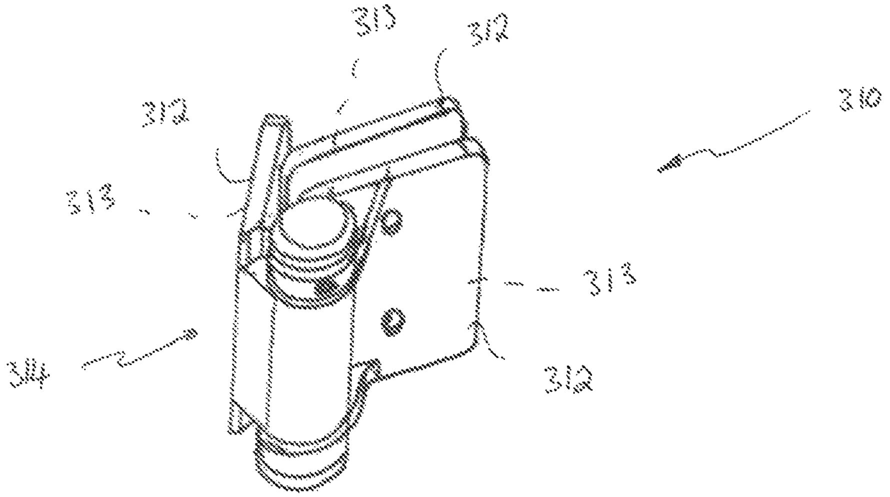
FIG. 27 is a schematic perspective view of a second embodiment frameless glass fencing hinge.

FIG. 27 shows another embodiment frameless glass fencing hinge 310, here a glass-to-wall or glass-to-post hinge. The hinge 310 includes a number of planar hinge members 312 configured so as to be attached to a non-illustrated glass panel and a wall/post. In this embodiment the hinge members 312 are produced from a polyarylamide having a 50-60% by volume glass fibre reinforcement concentration. It will of course be appreciated that other parts of the hinge 310 could also be produced from a polyarylamide having a 50-60% by volume glass fibre reinforcement concentration. Each of the hinge members 312 includes a non-illustrated rigid reinforcing member 313 over-moulded with the polyarylamide and embedded therein.

The hinge 310 includes a hinge closure mechanism 314 to facilitate relative pivotal movement between the non-illustrated glass panel and wall/post to which the hinge members 312 are attached. The hinge 310 operates in a conventional manner which will be familiar to persons skilled in the art. It is pointed out that the hinge closure mechanism 314 may be in the form of a spring mechanism, an hydraulic mechanism, a hydraulic with clutch mechanism, a combination spring and hydraulic mechanism or other hinge closure mechanisms.

In a non-illustrated embodiment, the hinge members of the frameless glass fencing hinge of FIGS. 26 and 27 are produced from an epoxy vinyl ester resin having a 50-70% by volume glass fibre reinforcement.

Figure 28:
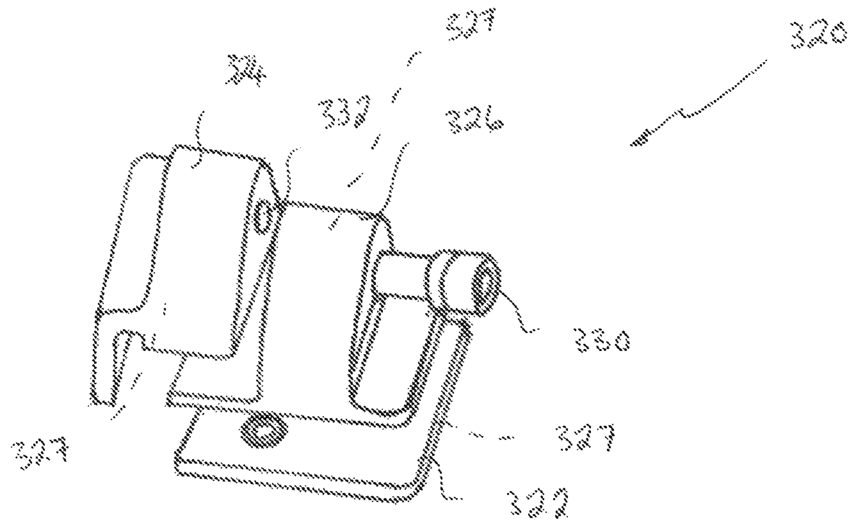
FIG. 28 is a schematic perspective view of a first embodiment frameless glass fencing latch.

FIG. 28 shows an embodiment frameless glass fencing latch 320, here a glass-to-wall or glass-to-post latch. The latch 320 includes a number of latch members 322, 324, 626 configured to be attached to a non-illustrated glass panel and wall/post. In this embodiment the latch members 322, 324, 326 are produced from a polyarylamide having a 50-60% by volume glass fibre reinforcement concentration. It will of course be appreciated that other parts of the latch 320 could also be produced from a polyarylamide having a 50-60% by volume glass fibre reinforcement concentration. Each of the latch members 322, 324, 326 includes a non-illustrated rigid reinforcing member 327 over-moulded with the polyarylamide and embedded therein.

The latch 320 includes a latch mechanism 328, housed by the latch member 326. The latch and latch mechanism 320, 328 operate in a conventional manner which will be familiar to persons skilled in the art. In this specific embodiment, a latch locking member 330 of the latch mechanism 328 is operatively received within a slot 332 of the latch member 334 when the latch mechanism 328 is located in its locked configuration.

Figure 29:
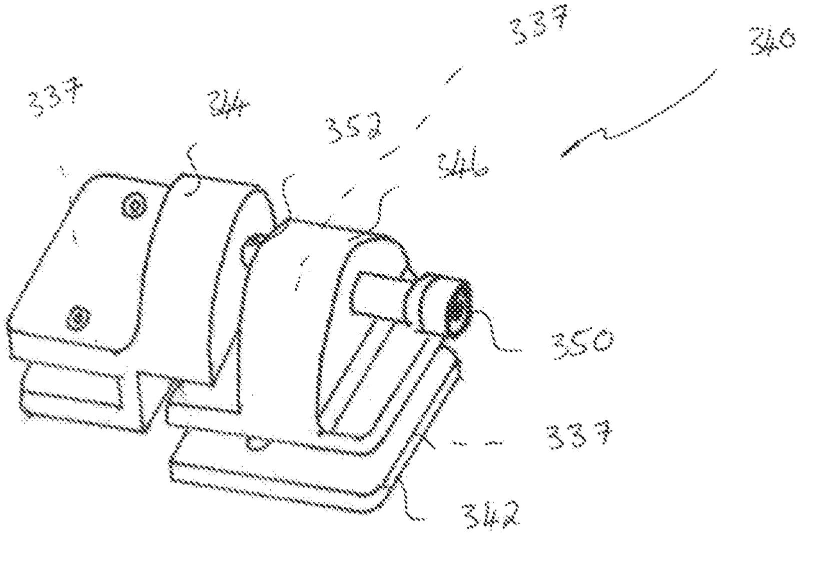
FIG. 29 is a schematic perspective view of a second embodiment frameless glass fencing latch.

FIG. 29 shows an embodiment frameless glass fencing latch 340, a here a glass-to-glass 180° latch. The latch 340 includes a number of latch members 342 configured so as to be attached to non-illustrated glass panels. In this embodiment the latch members 342, 344, 346 are produced from a polyarylamide having a 50-60% by volume glass fibre reinforcement concentration. It will of course be appreciated that other parts of the latch 340 could also be produced from a polyarylamide having a 50-60% by volume glass fibre reinforcement concentration. Each of the latch members 332, 334, 336 includes a non-illustrated rigid reinforcing member 337 over-moulded with the polyarylamide and embedded therein.

The latch 340 includes a latch mechanism 348, housed by the latch member 346. The latch and latch mechanism 340, 348 operate in a conventional manner which will be familiar to persons skilled in the art. In this embodiment, a latch locking member 350 of the latch mechanism 348 is operatively received within a slot 352 of the latch member 344 when the latch mechanism 348 is located in its locked configuration.

In a non-illustrated embodiment, the latch members of the frameless glass fencing latch of FIGS. 28 and 29 are produced from an epoxy vinyl ester resin having a 50-70% by volume glass fibre reinforcement. It will of course be appreciated that other parts of the frameless glass fencing latch could also be produced from an epoxy vinyl ester resin having a 50-70% by volume glass fibre reinforcement.

Figure 30:
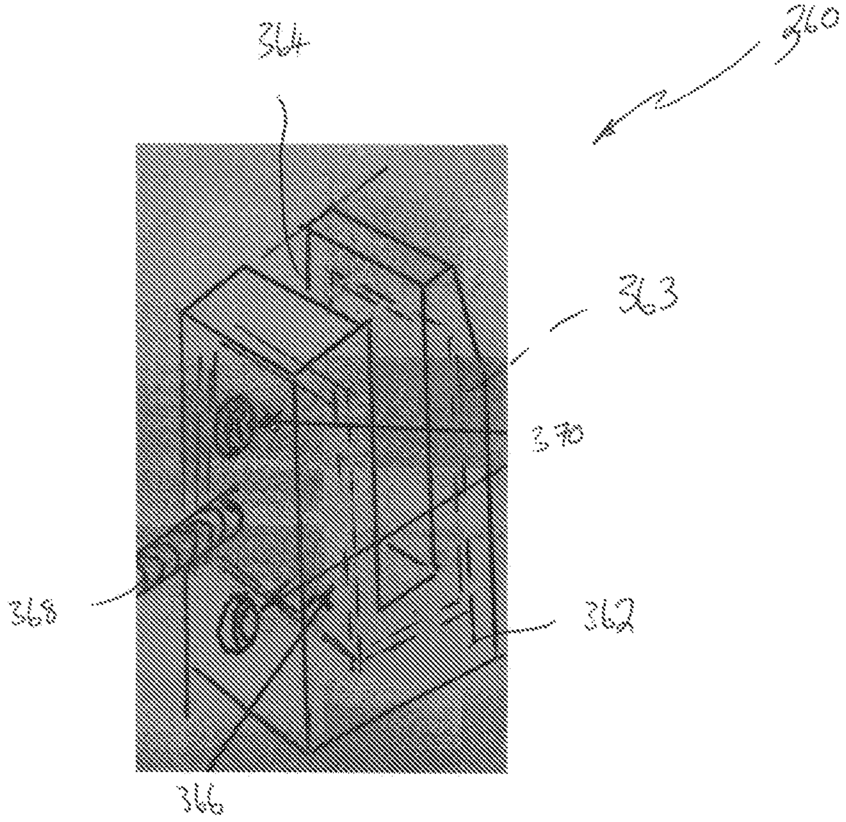
FIG. 30 is a schematic perspective view of an embodiment frameless glass fencing face fixed spigot.

FIG. 30 shows yet a further embodiment frameless glass fencing component, here another spigot, specifically a face fixed spigot 360. The spigot 360 includes a spigot body 362 which defines a slot 364 for receiving an end portion of a non-illustrated tempered glass panel when constructing a non-illustrated frameless glass fence. In this embodiment the spigot body is produced from an engineering plastic, specifically a polyarylamide having a 50-60% by volume glass fibre reinforcement concentration. The spigot 360 has an outer coating to provide the appearance of a stainless steel or coloured finish. The spigot body 362 includes a non-illustrated rigid reinforcing member 363 over-moulded with the polyarylamide and embedded therein.

Typically, the glass panel is secured within the slot 364 with non-illustrated grub screws passing through non-illustrated transverse holes in the spigot body 362. The spigot body 362 includes a flat face 366 which is attached to a fastener 368, here an M16 bolt, which is operatively embedded within a building structure. The flat face 366 also includes holes 370 through which non-illustrated screw fasteners can pass when the spigot 360 is required to be secured to, for example a timber beam.

In a non-illustrated embodiment, the spigot body of FIG. 30 is produced from an epoxy vinyl ester resin having a 50-70% by volume glass fibre reinforcement.

In yet another non-illustrated embodiment the spigot body of FIG. 20 is produced from a polyamide having a glass fibre reinforcement.

Although the invention is described above in relation to preferred embodiments, it will be appreciated by those skilled in the art that it is not limited to those embodiments, but may be embodied in many other forms.

The invention claimed is:

1. A frameless glass fencing spigot for a frameless glass fencing installation, wherein the frameless glass fencing spigot is configured to support a bottom edge of the glass panel and is (i) produced from an engineering plastic including a base material and reinforcing fibre filler, and (ii) has an embedded reinforced plastic reinforcing member over-molded with the engineering plastic;

wherein the reinforcing member includes a holding portion and a base portion, the holding portion and the base portion being of unitary construction, the base portion having a hole to allow the passage of engineering plastic therethrough during production.

2. A frameless glass fencing spigot according to claim 1 wherein the engineering plastic is covered with a coating.

3. A frameless glass fencing spigot according to claim 1, wherein the reinforcing fibre filler includes glass fibre.

4. A frameless glass fencing spigot according to claim 1, wherein the reinforcing fibre filler includes carbon fibre.

5. A frameless glass fencing spigot according to claim 1, wherein the engineering plastic is a polyarylamide.

6. A frameless glass fencing spigot according to claim 5, wherein the polyarylamide includes glass fibre reinforcement wherein the concentration of the glass fibre reinforcement is between 50% to 60% by volume.

7. A frameless glass fencing spigot according to claim 1, wherein the engineering plastic is an epoxy vinyl ester resin.

8. A frameless glass fencing spigot according to claim 7, wherein the epoxy vinyl ester resin includes glass fibre reinforcement wherein the concentration of the glass fibre reinforcement is between 50% to 70% by volume.

9. A frameless glass fencing spigot according to claim 1, wherein the base material includes a polyamide, polyphenylene sulphide (PPS), or styrene.

10. A frameless glass fencing spigot according to claim 1, including (i) a post portion defining a slot operatively adapted to hold a portion of a glass panel of the frameless glass fencing installation, and (ii) a flange portion or a threaded portion operatively adapted to secure the post portion in an upright orientation.

* * * * *